United States Patent
Moseley et al.

[11] Patent Number: 5,669,993
[45] Date of Patent: Sep. 23, 1997

[54] TIRE TREAD ELEMENTS WITH BUILT-IN TWIST

[75] Inventors: Dale Jay Moseley, Hudson; Samuel Patrick Landers, Uniontown, both of Ohio

[73] Assignee: The Goodyear Tire & Rubber Company, Akron, Ohio

[21] Appl. No.: 496,657

[22] Filed: Jun. 29, 1995

[51] Int. Cl.$^6$ .................................................. B60C 107/00
[52] U.S. Cl. ................................................ 152/209 R
[58] Field of Search .......................... 152/209 R, 209 D, 152/209 B; 267/141.1, 153; 185/37

[56] References Cited

U.S. PATENT DOCUMENTS

| | | | |
|---|---|---|---|
| 1,349,055 | 8/1920 | Forbes | 152/209 R |
| 1,413,190 | 4/1922 | Rapson | 152/209 R |
| 4,796,683 | 1/1989 | Kawabata et al. | 152/209 R |
| 5,016,696 | 5/1991 | Bonko et al. | 152/209 |

FOREIGN PATENT DOCUMENTS

| | | | |
|---|---|---|---|
| 0605849A1 | 7/1994 | European Pat. Off. | B60C 11/03 |
| 100706 | 4/1992 | Japan | 152/209 R |
| 3262 | of 1908 | United Kingdom | 152/209 R |
| 748078 | 4/1956 | United Kingdom | 185/37 |

*Primary Examiner*—Steven D. Maki
*Attorney, Agent, or Firm*—Roger D. Emerson

[57] ABSTRACT

A tire having a tread has tread elements which, when compressed radially, exhibit a net torque. The net torque so generated can be directed and designed so as to affect the tire's residual self-aligning torque (also known as RSAT). One embodiment of the invention features a tire tread having a tread element which has a shape resembling a top surface with the tread element being twisted relative to a bottom surface of the tread element. Upon radial loading, the tread element is compressed and generates the net torque about the centroid of the tread element.

3 Claims, 15 Drawing Sheets

TIRE TREAD ELEMENTS WITH BUILT-IN TWIST

BACKGROUND OF THE INVENTION

1. Field of Invention

This invention pertains to the art of pneumatic tires and more specifically to the field of pneumatic tires featuring tread elements which generate a net torque about an individual tread element or about the tire tread footprint as a whole.

2. Description of the Related Art

One of the challenges facing tire designers is that of "residual self-aligning torque" or "RSAT." Tire treads have been designed in the past to reduce the undesirable effects of RSAT. For example, in European patent application no. 0 605 849 A1, a rib-type tire tread is disclosed which has been modified to provide draft angles in lateral grooves of selected ribs to purportedly compensate for the tire's residual self-aligning torque.

The present invention is directed toward a new and improved tire tread design which is effective in use and overcomes the foregoing difficulties in others while providing better and more advantageous overall results.

SUMMARY OF THE INVENTION

In accordance with the present invention, a new and improved tire tread design featuring new and improved tire tread elements is provided which is adapted to address the problem of RSAT.

More particularly, in accordance with the invention, a tread element in a tire tread has a centroid and generates a net torque about a radial line passing through the centroid when the tread element is compressed.

According to a further aspect of the invention, a tire tread comprises a tread element having a top surface and side surfaces. The side surfaces extend radially outwardly from a tread base and meet to form edges, the edges being curved lines in space.

According to a further aspect of the invention, a tire tread has an tread element. The tread element has a top surface which is radially displaced from a base surface of the tread. The tread element has side surfaces extending between the top surface and the base surface. The base surface of the tread element is generally a radially inwardly directed projection of the top surface of the tread element onto a tread plane, the top surface onto the base surface. The top surface of the tread element being configured as if it were rotated about a radial line passing through a centroid of the top surface with the side surfaces forming curved lines in space.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and certain arrangement of parts, a preferred embodiment of which will be described in detail in the specification and illustrated in the accompanying drawings, which form a part hereof and wherein.

DETAILED DESCRIPTION OF THE INVENTION

The invention also may be better understood in the context of the following definitions, which are applicable to both the specification and the appended claims:

"Axial" and "axially" are used herein to refer to lines or directions that are parallel to the axis of rotation of the tire.

"Circumferential" means lines or directions extending along the perimeter of the surface of the annular tread perpendicular to the axial direction.

"Circumferential plane" means the plane perpendicular to the tire's axis of rotation and passing through the center of its tread.

"Footprint" means the contact patch or area of contact of the tire tread with a flat surface at zero speed and under normal load and pressure, including the area occupied by grooves as well as the tread elements.

"Lateral" means an axial direction.

"Leading" refers to a portion or part of the tread that contacts the ground first, with respect to a series of such parts or portions during the rotation of the tire in the preferred direction.

"Inner tread surface" means that part of the tread between the protruding tread lugs.

"Outer tread surface" or "ground penetrating surface" means the radially outermost surface of the protruding tread lugs.

"Radial" and "radially" are used to mean directions radially toward or away from the axis of rotation of the tire.

"Trailing" refers to a portion or part of the tread that contacts the ground last, with respect to a series of such parts or portions during rotation of tire and the preferred direction.

With particular reference now to the drawings wherein the showings are for the purposes of illustrating a preferred embodiment of the invention only and not for purposes of limiting the same, FIGS. 1–15 generally show tire treads, tire tread elements, and graphical presentations of the qualities of those tread elements and tire treads. Generally, tire tread elements have vertically oriented sides which meet to form edges. The edges are straight lines generally directed radially toward the rotational axis of the tire. The present invention concerns tire treads which are especially configured to address the tire's residual self-aligning torque (RSAT). In one embodiment of the invention, the tire tread elements which utilize a "twisted" orientation where the sides of the tread element are actually curved planes in space and meet to form edges which are curved lines in space. It is helpful to understand the orientation of the tread element by imagining a cubic block of rubber in which the top surface has been twisted through some angle relative to the bottom surface.

Figure 1:
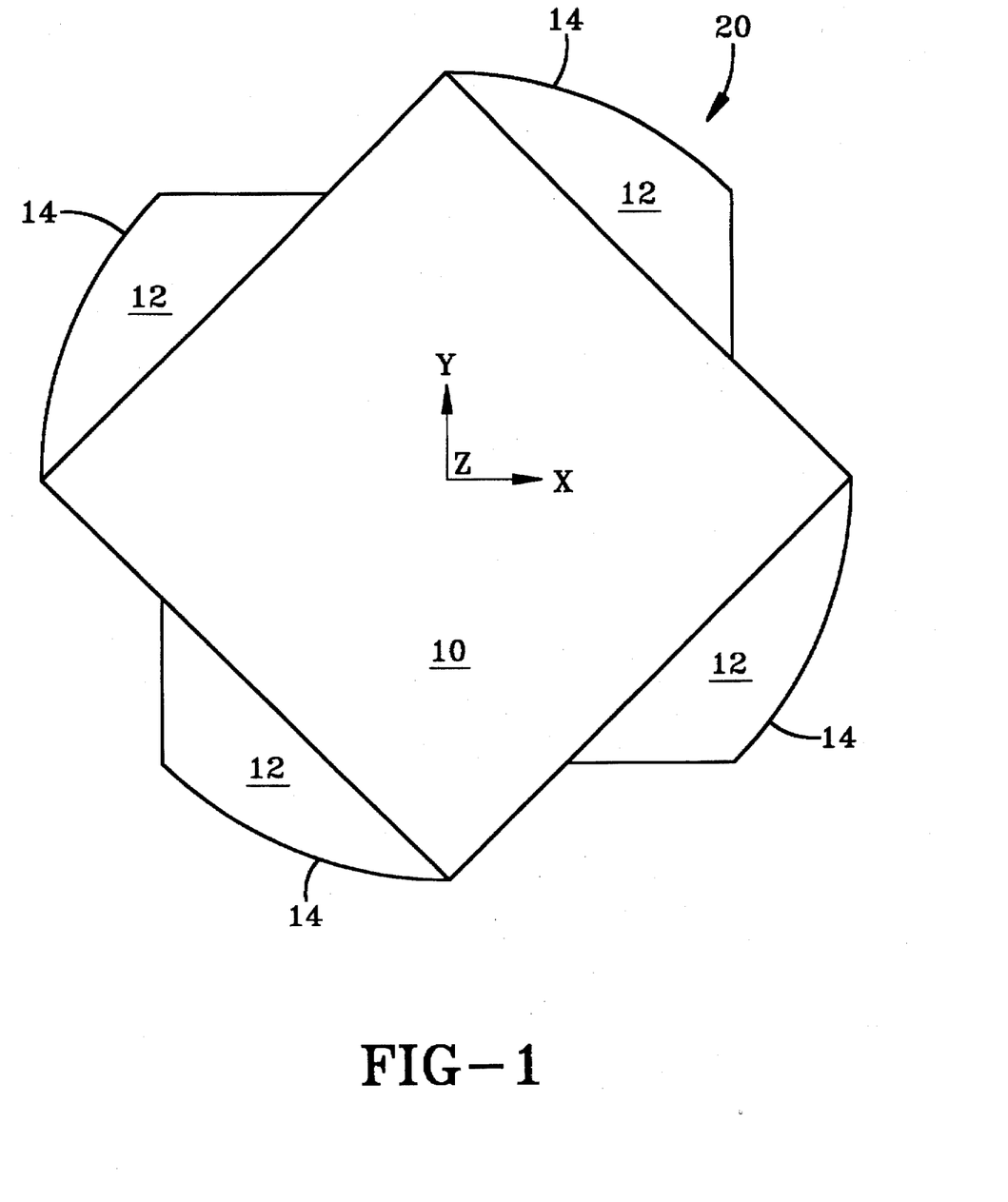
FIG. 1 is a top view of a solid block of rubber having the general configuration of a solid cube in which the top surface has been twisted relative to the bottom surface.

For example, with reference to FIG. 1, a block 20 of rubber is shown in which a top surface 10 has been rotated relative to a bottom surface (not shown in this view). Side surfaces 12 have the configuration of twisted planes in space with their edges 14 meeting to form curved lines in space. In the block 20 shown in FIG. 1, the block 20 is in the shape of a cube. This configuration was chosen for a finite element analysis to be discussed later, since the cubical configuration simplified the mathematic calculations. The block 20, or a tread element, could, of course, have any configuration and the basic principles and advantages of the invention is disclosed herein would apply to those configurations as well.

Figure 2:
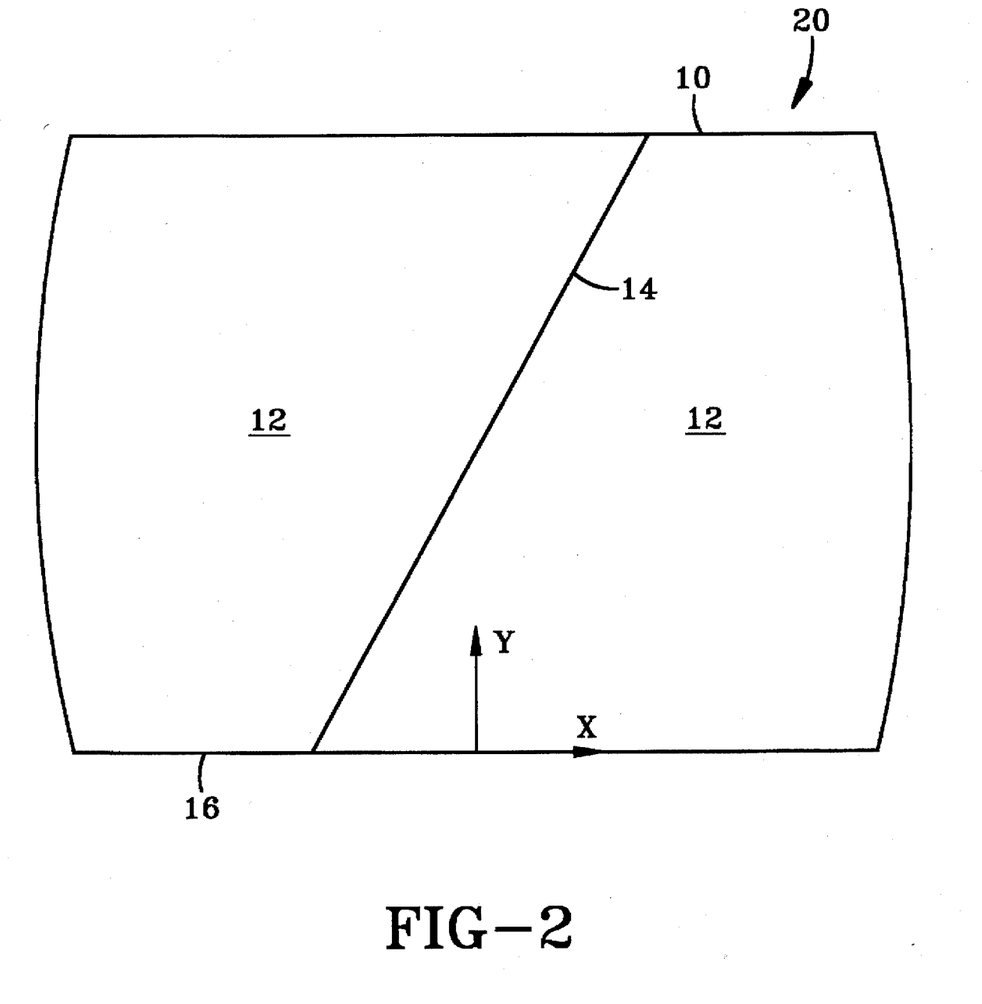
FIG. 2 is a side view of the solid block of rubber shown in FIG. 1.

With reference to FIG. 2, a side view of the same "twisted" cubical tread element is shown along with bottom surface 16.

Figure 3:
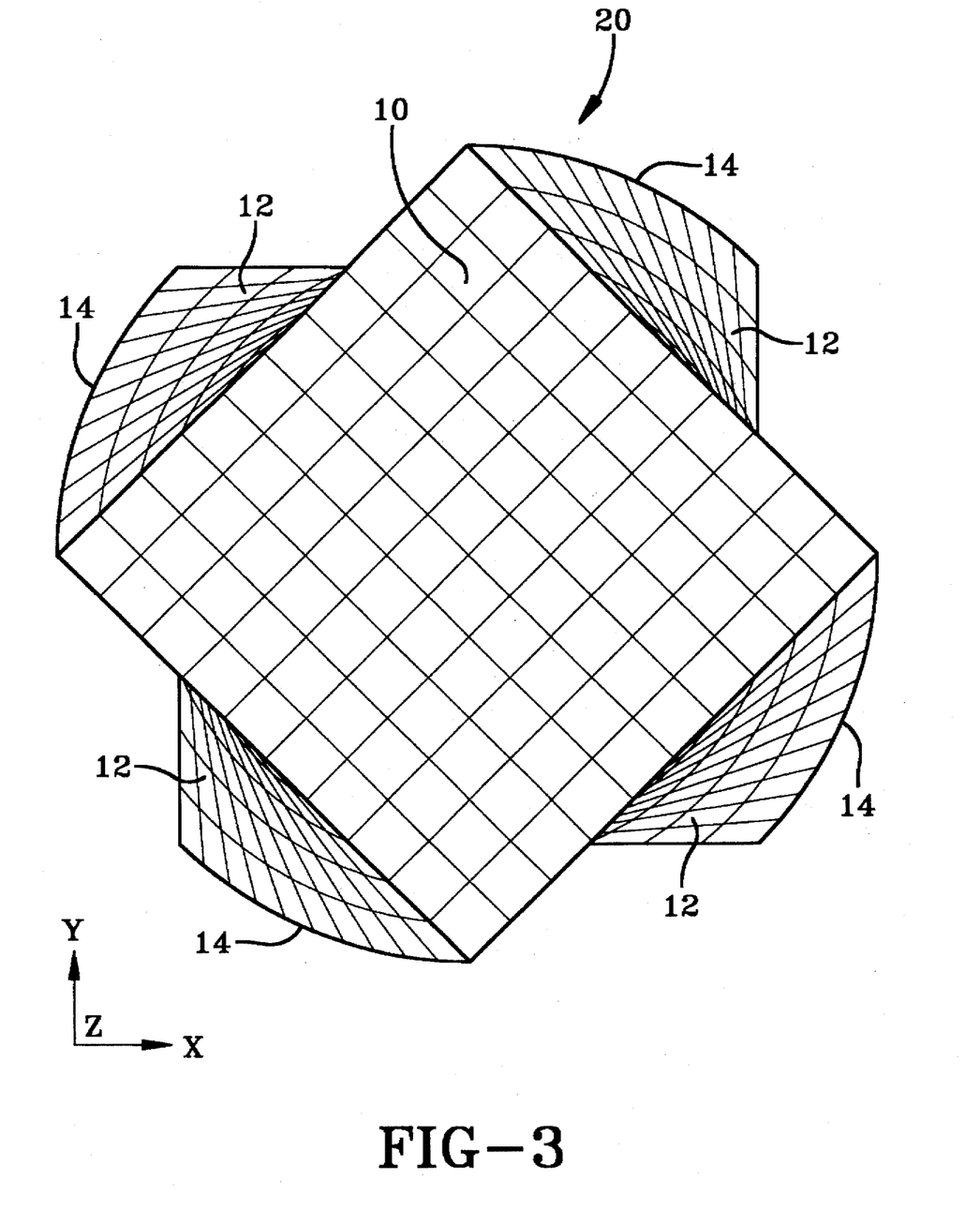
FIG. 3 is a top view of the rubber block shown in FIG. 1 having been subdivided into a 10×10×10 mesh of 1,000 finite elements.

With reference to FIG. 3, the block shown in FIG. 1 is further shown as a 10×10×10 mesh. Subdividing a volume into a mesh is generally necessary and helpful for analyses involving finite element modeling. The "twisted" nature of the tread element is easily seen in FIG. 3.

Figure 4:
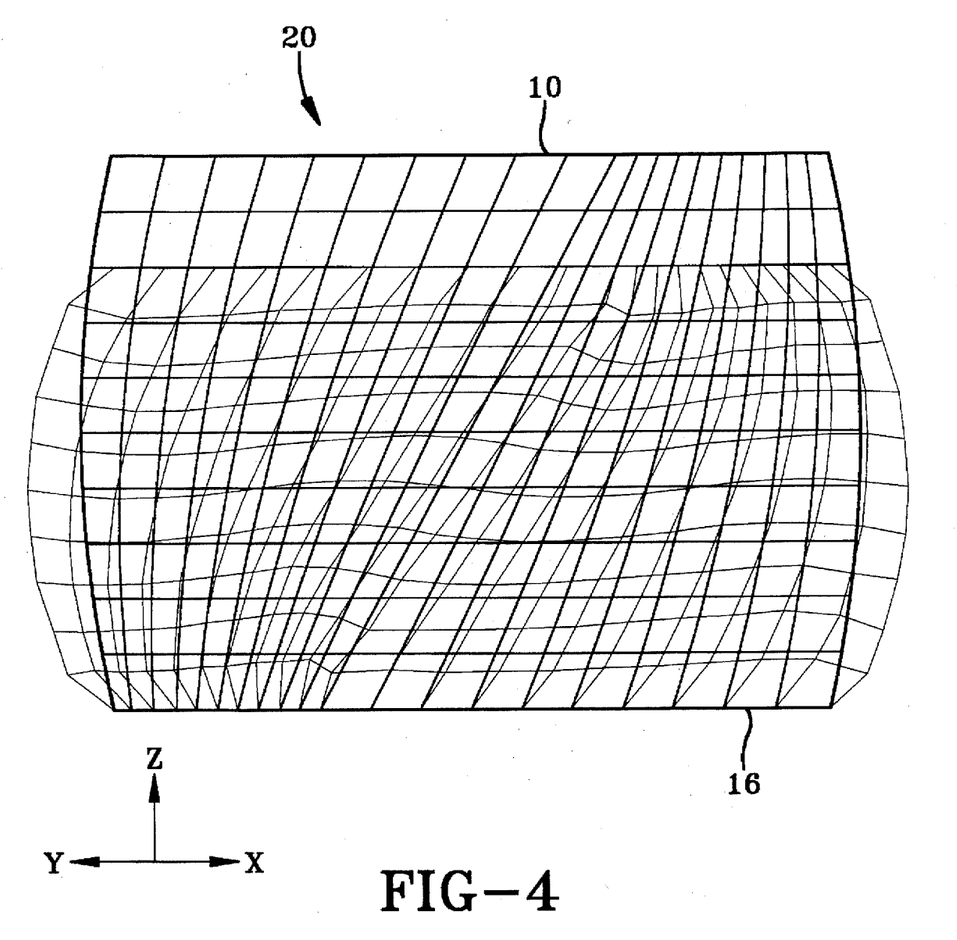
FIG. 4 is side view of the rubber block shown in FIG. 3, with the block shown in bold lines and in undeflected, uncompressed state and shown in hidden lines in a deflected, compressed state.
Figure 5:
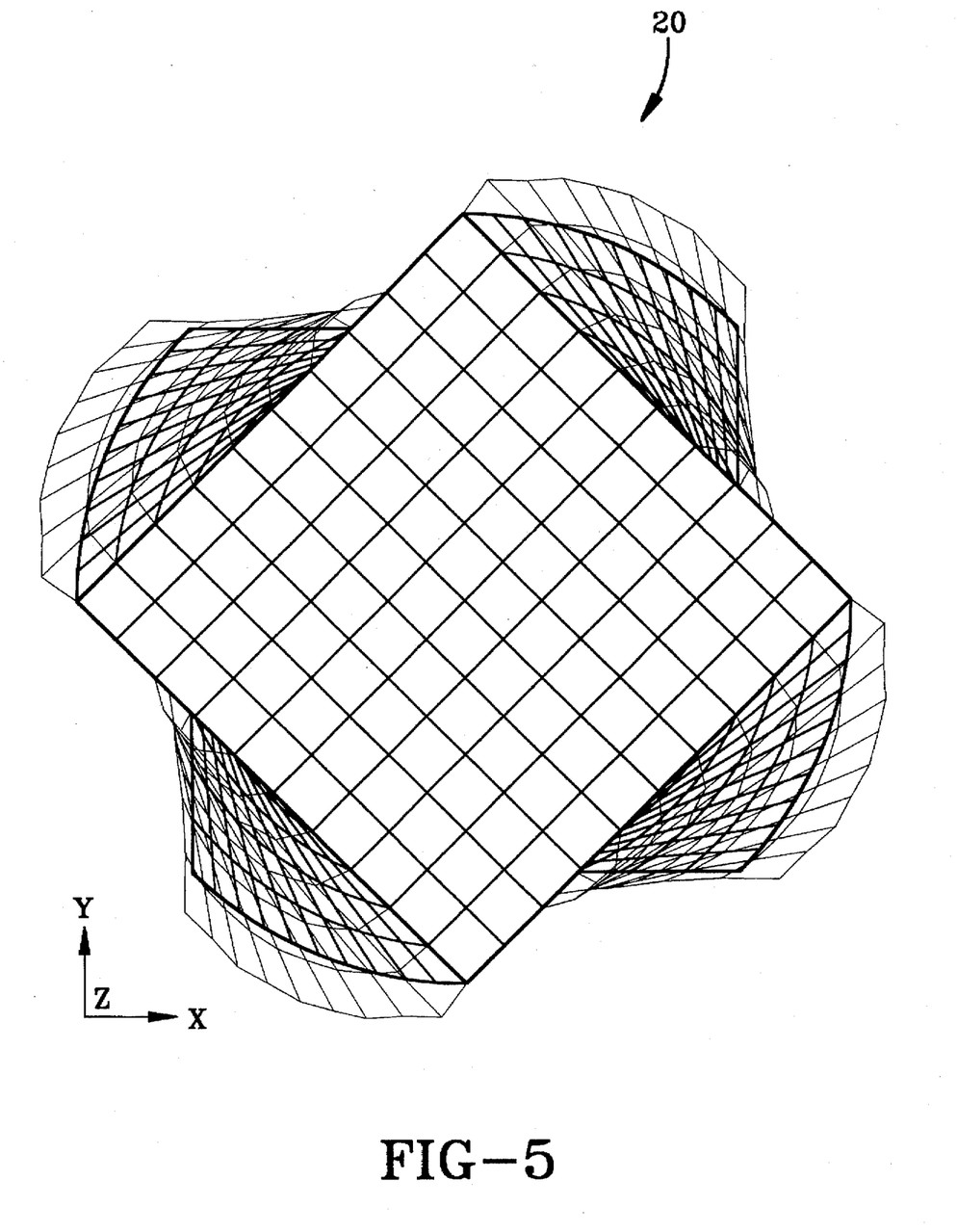
FIG. 5 is a top view of the 10×10×10 mesh shown in FIG. 4 with the undeflected block being shown in bolded lines and the block under a deflection due to a normal load on the top surface shown in hidden lines.

In FIG. 4, a side view of the tread element shown in FIG. 3 is shown after it has been deformed to a 20% compression by a force directed normally, i.e., perpendicularly, to its top surface 10. Likewise, FIG. 5 shows a top view of the same tread element 20 with the same deformation.

Figure 6:
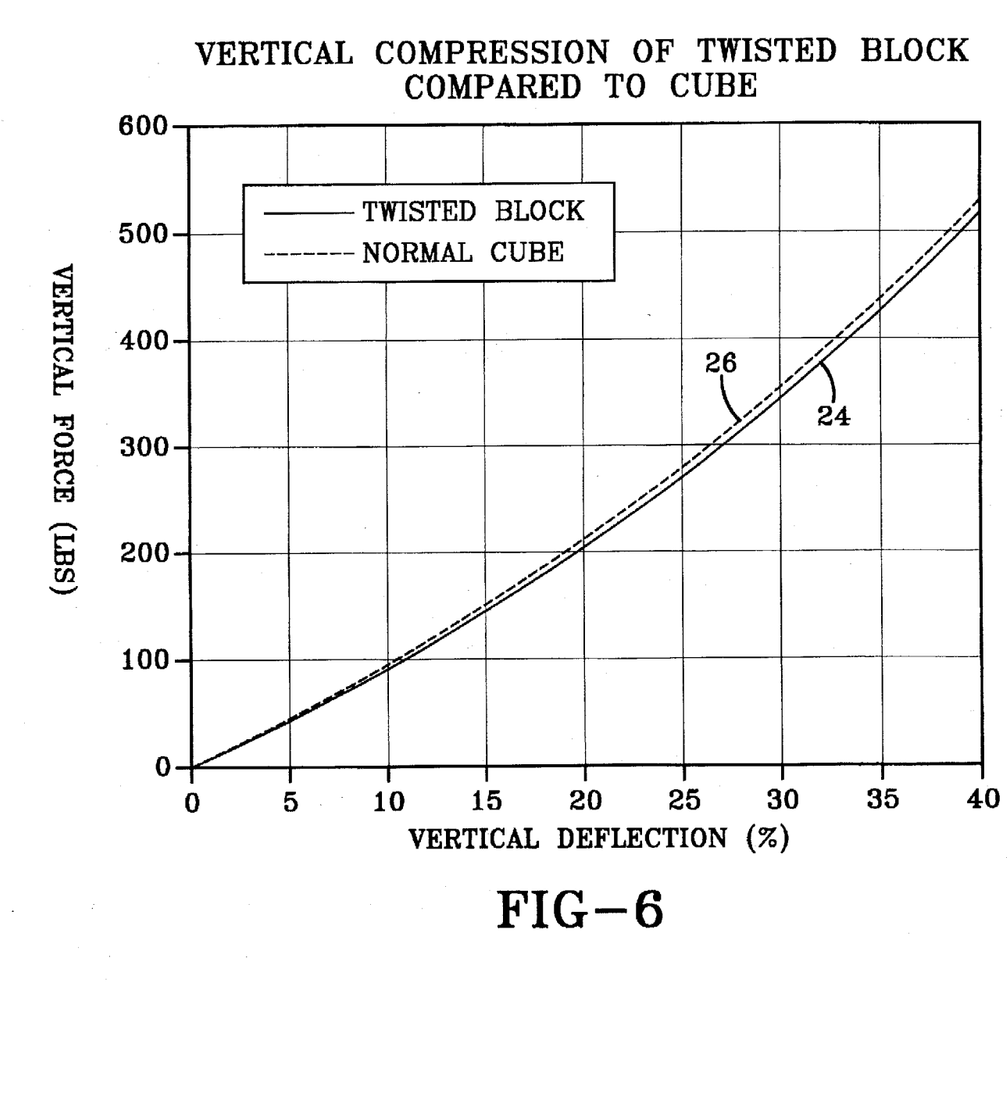
FIG. 6 is a graph showing the vertical compression of a twisted block compared to a normal cube, the normal cube being a 1 inch×1 inch×1 inch and the twisted block has the same nominal dimensions plus a 45° rotation.

With reference to FIG. 6, the vertical compression of the twisted block 20 is shown by the solid line 24 while the vertical compression of an untwisted cube, referred to in the graph as a "normal cube" is shown by the dashed line 26. It can be seen that the twisted block 20 deflects more in the vertical direction than does the normal cube, with the normal cube being slightly stiffer.

Figure 7:
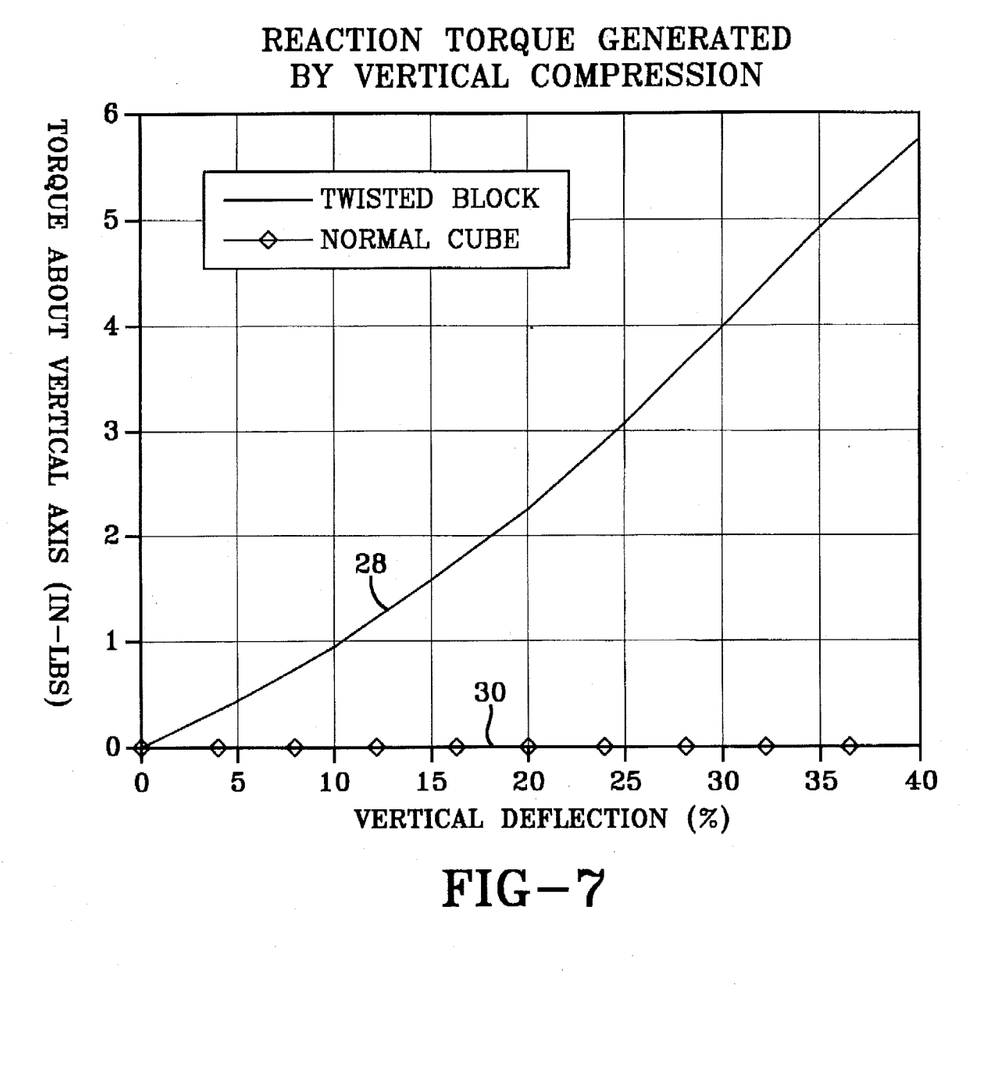
FIG. 7 is a graph showing the calculated reaction torque generated by vertical compression of the twisted block verses the normal cube.

With reference to FIG. 7, the graph shows that the twisted block 20 generates torque about a vertical axis. This quality is believed to be unique and novel and heretofore not utilized by tire designers to address the problem of RSAT. For example, in FIG. 7, line 28 indicates the torque in inch-pounds about a vertical axis as the deflection of the block increases. Note that the line 30 with diamonds indicates the reaction torque generated on a normal cube. In contrast, the "normal cube" tread element generates absolutely no torque. Note that line 30 is coincident with the horizontal axis of graph 2, indicating that the normal cube generates no reaction torque.

This quality of the twisted block 20, the quality of generating torque about an individual tread element or about the tread footprint is believed to be of import in regard to solving the problems presented by residual self-aligning torque (RSAT).

According to a finite element analysis performed to investigate and study the present invention, a 1 inch×1 inch (2.54 cm by 2.54 cm) normal cube which was modified so that it resembled such a cube with a 45 degree rotation of the top surface relative to bottom surface produced about 5 inch-pounds of torque when loaded with a 500 pound radial, i.e., vertical, load.

Figure 8:
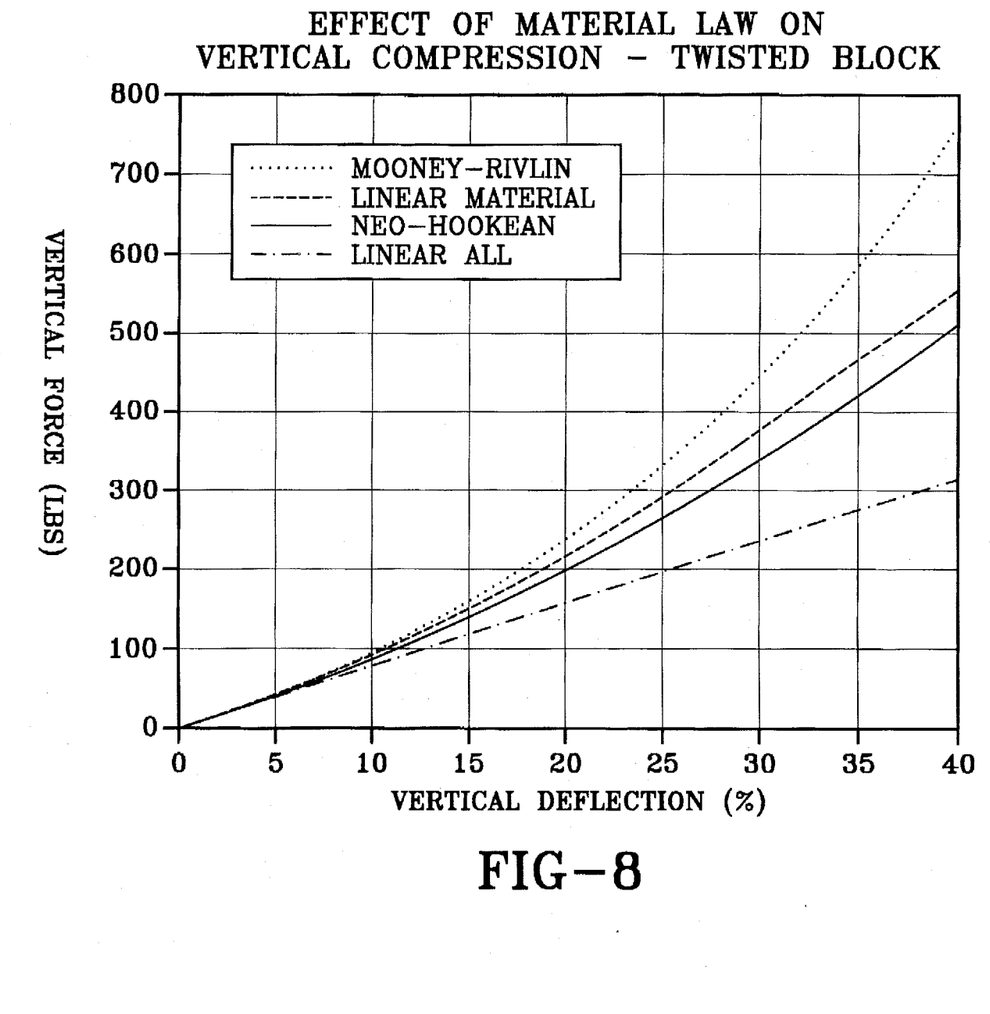
FIG. 8 is a graph showing the effect of various material laws on vertical compression twisted blocks.
Figure 9:
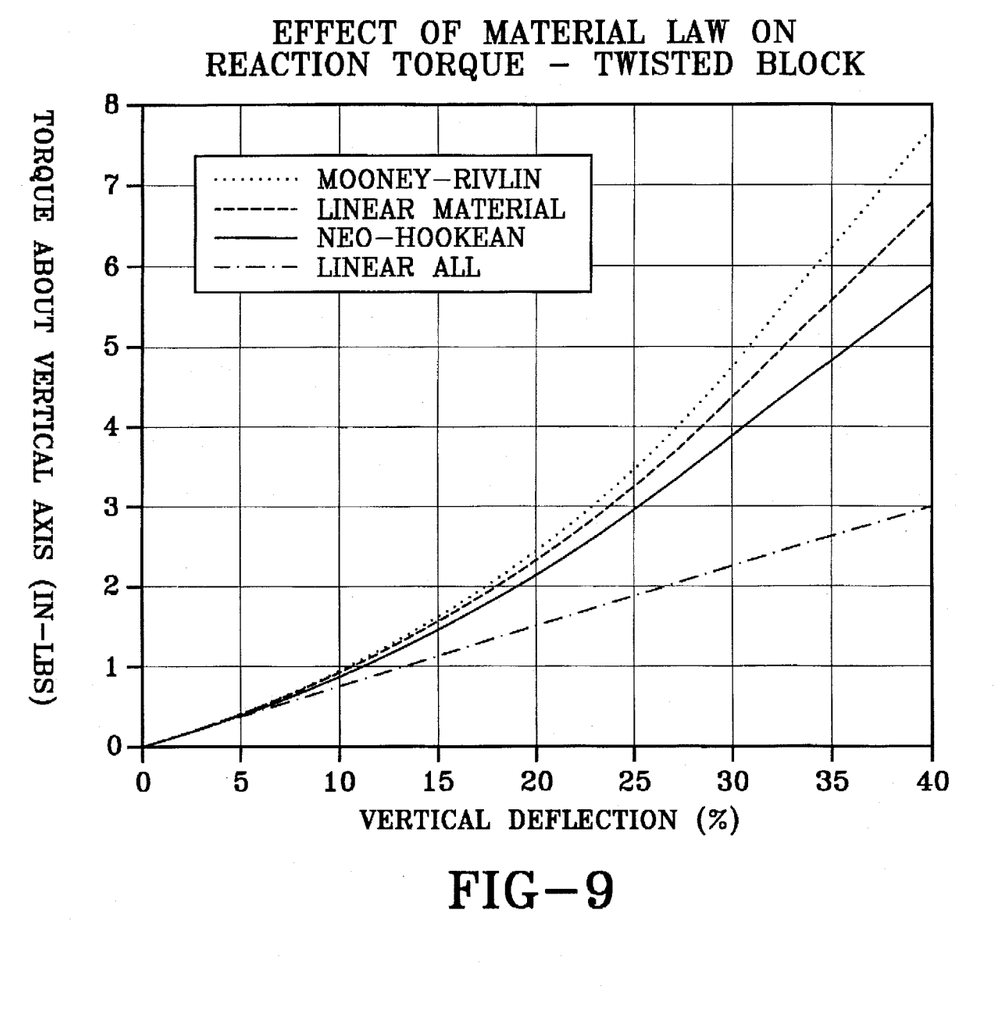
FIG. 9 is a graph showing the effect of the various material laws on reaction torque of the twisted block.

With reference to FIGS. 8 and 9, various scientific methods of analyzing stress, strain, and torque relationships were applied to the blocks. In each case, regardless of the material law applied, the twisted block 20 as illustrated in FIG. 1 consistently demonstrated torque generated by a radially, i.e., vertically, directed compressive load.

Figure 10:
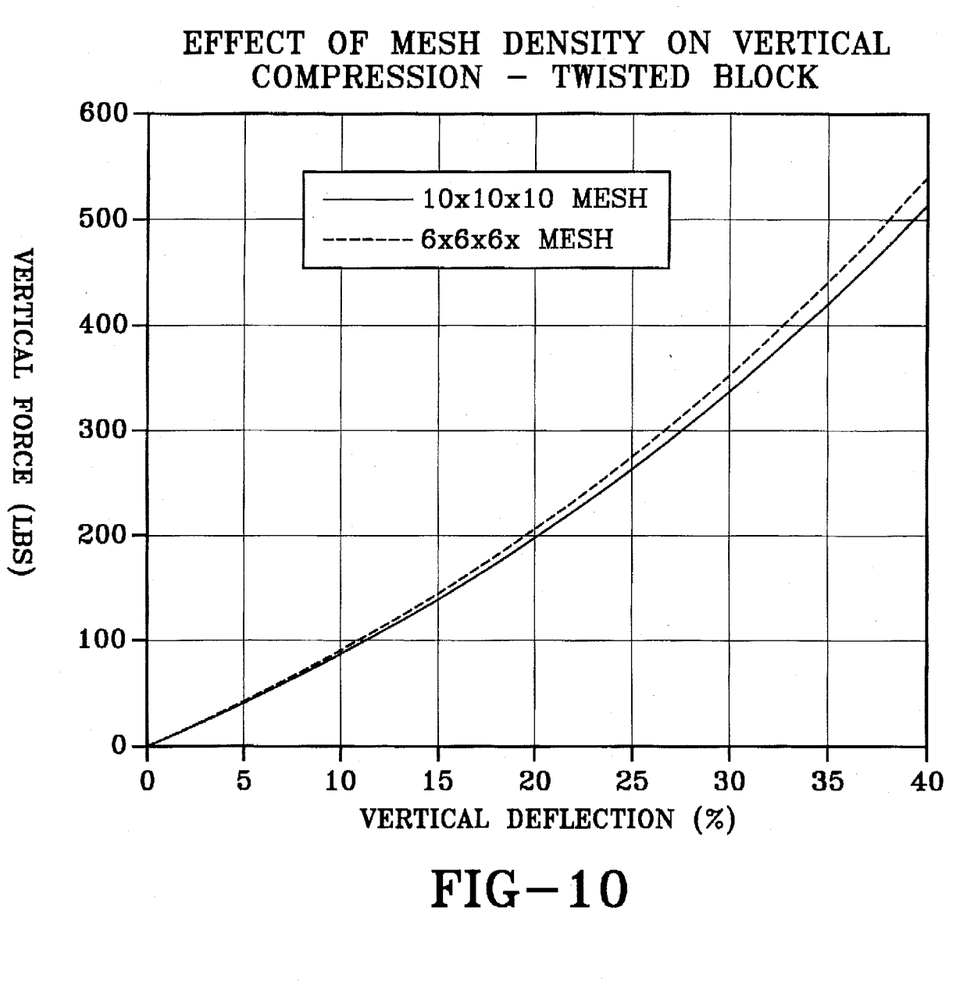
FIG. 10 is a graph showing the effect of mesh density on vertical compression twisted blocks.
Figure 11:
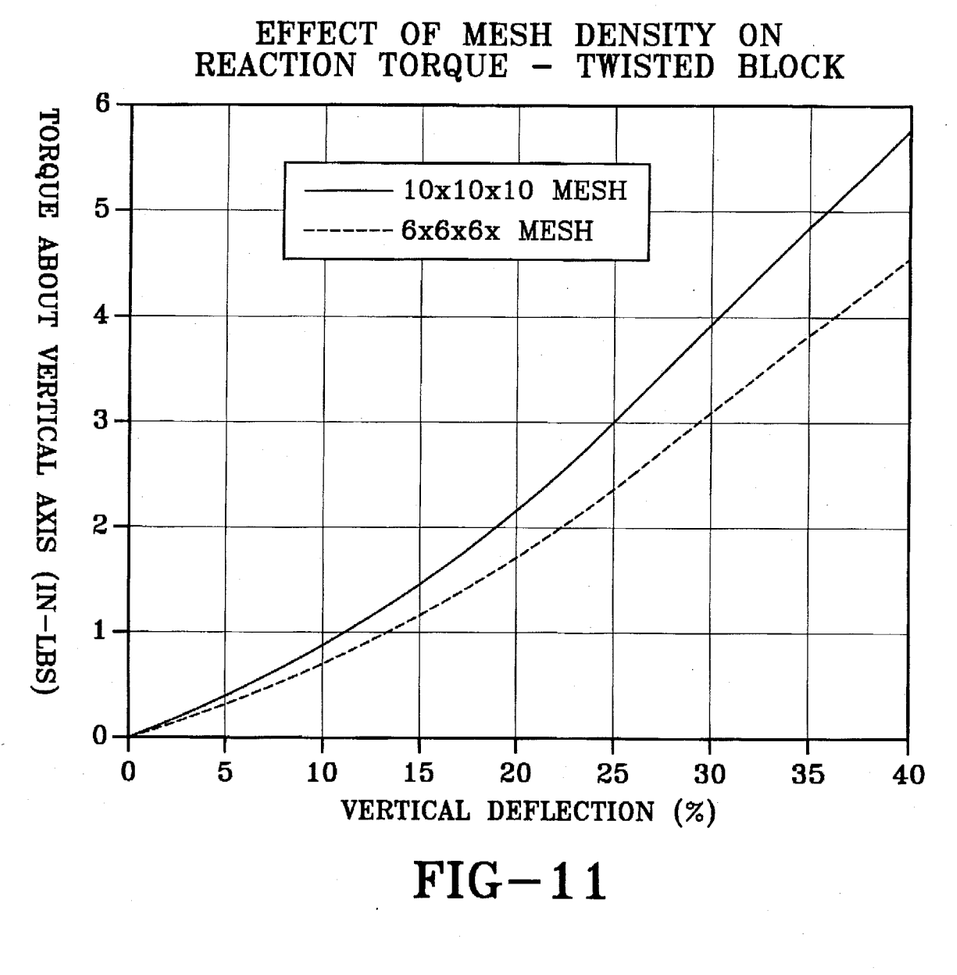
FIG. 11 is a graph showing the effect of mesh density on reaction torque twisted blocks.
Figure 12A:
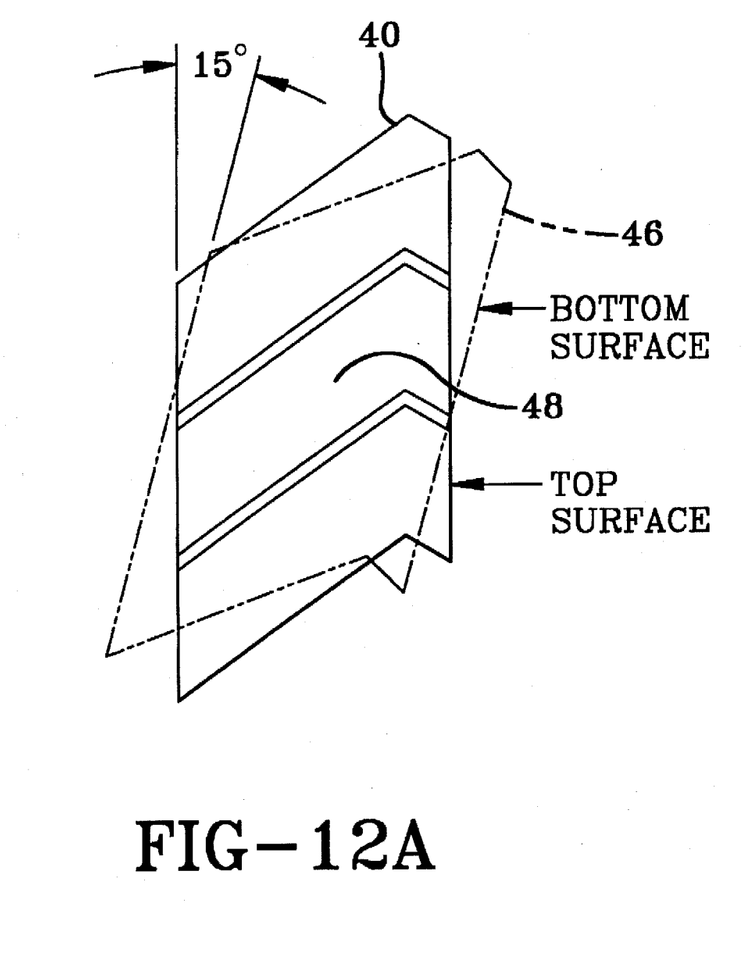
FIG. 12A is a top view of a tread element with the top surface shown in bolded lines and rotated 15 degrees from the bottom surface shown in dotted lines.
Figure 12B:
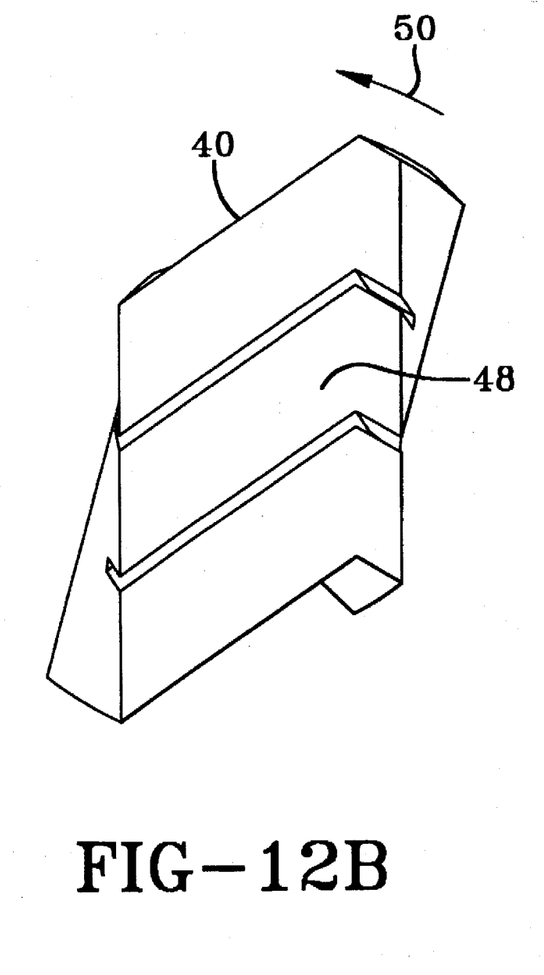
FIG. 12B is a top view of a tread element shown in FIG. 12A but shown with the hidden lines removed.
Figure 13A:
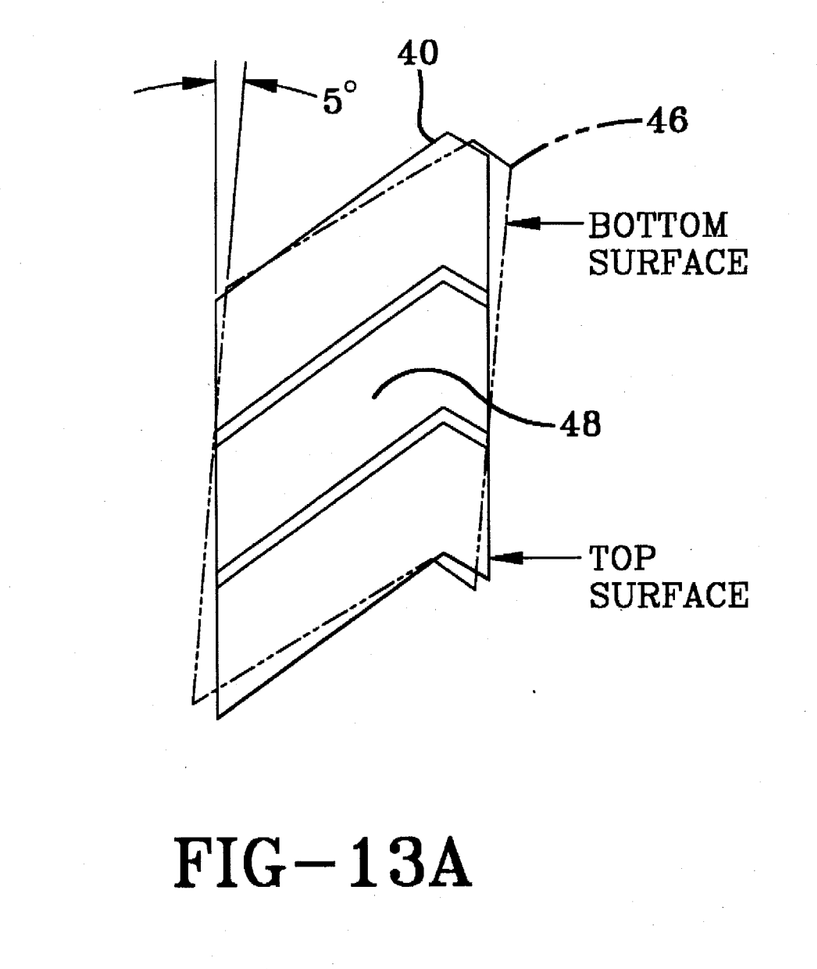
FIG. 13A is a top view of a tread element with a 5 degree rotation.
Figure 13B:
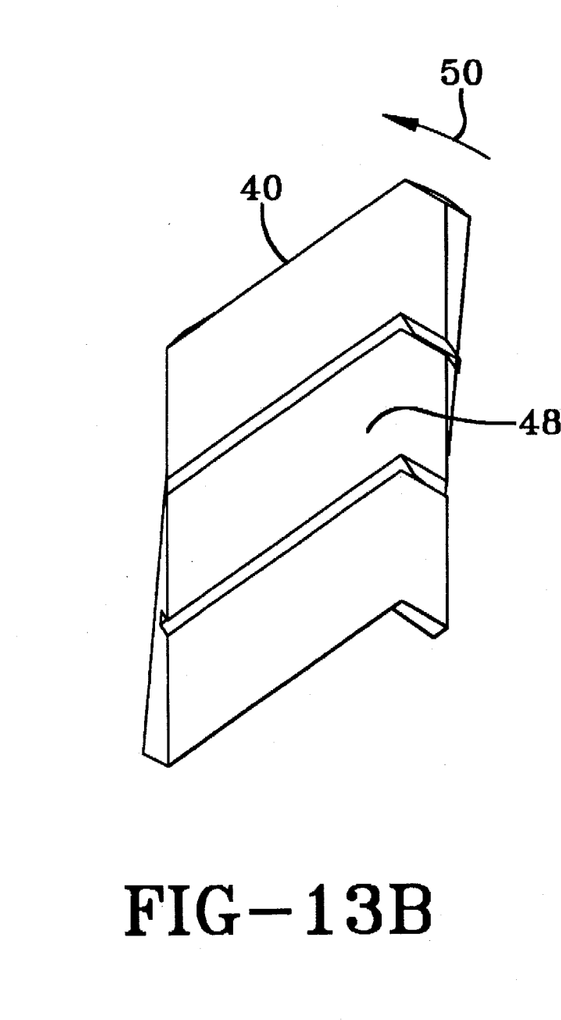
FIG. 13B is a top view of the tread element shown in FIG. 13A but with the hidden lines removed.

With reference to FIGS. 10 and 11, the results of the finite element analysis were essentially the same, regardless of the mesh density utilized.

In an effort to apply the initial finite element analysis to a more realistic tread element shape, the tread elements shown in FIGS. 12A, 12B, and FIGS. 13A and 13B were developed. Finite element meshes for each tread element were also developed. The tread element 48 shown in FIGS. 12A and 12B has a 15 degree twist while the tread element 48 shown in FIG. 13A and 13B has a 5 degree twist. A finite element mesh was developed, as shown in FIG. 14.

The results showed that each of the tread elements 48 generated an self-aligning torque in the direction of the rotation angle. For example, in FIG. 12 and 12B, the top surface 40 has been twisted counterclockwise in the direction of arrow 50 by 15 degrees. Therefore, compressing the top surface 40 of this tread element 20 generates a reaction torque of about 1.1 inch-pounds in the direction of arrow 50 when the top surface 40 of the tread element 48 is loaded with a 50 pound radially directed force.

Figure 14:
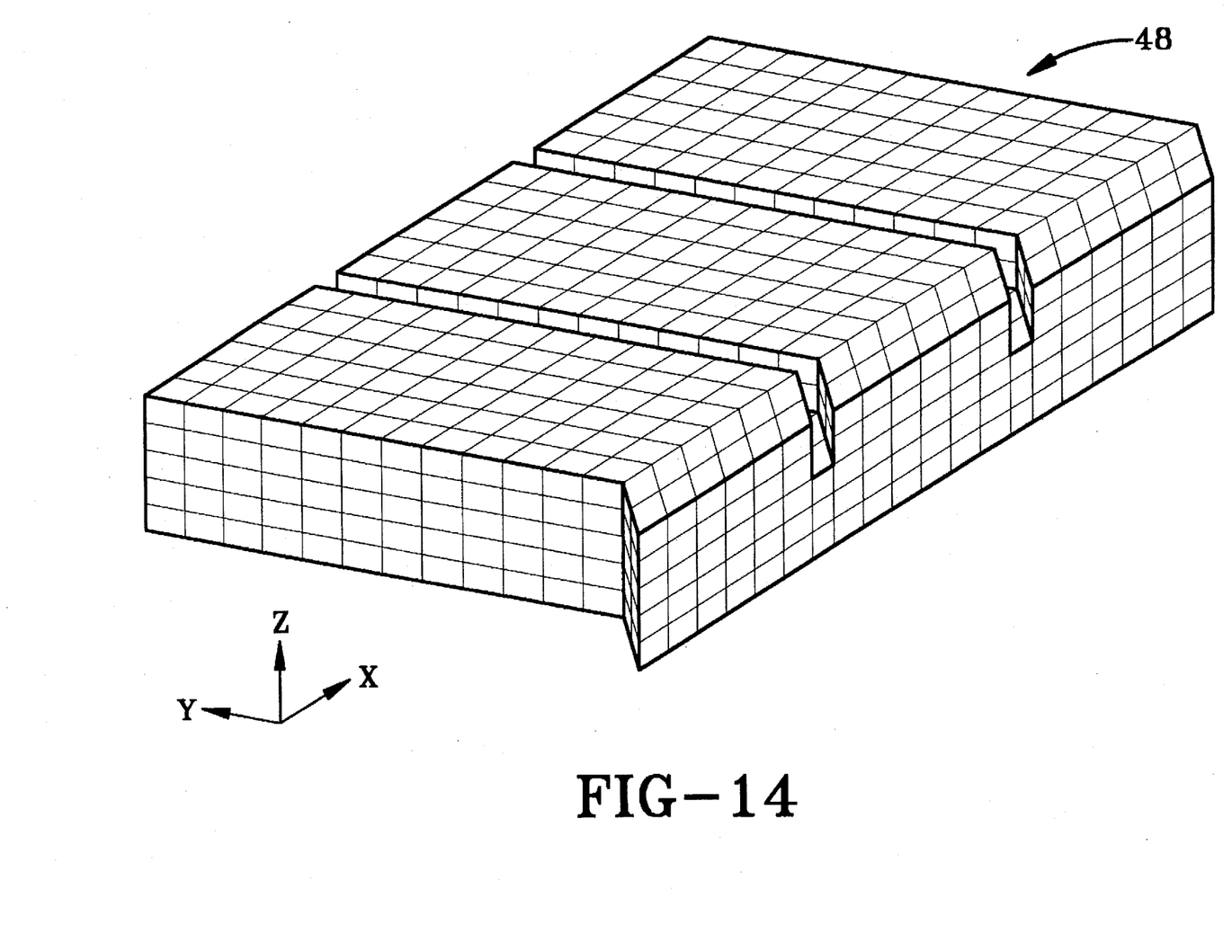
FIG. 14 is a perspective view of a finite element mesh of a tread element which was the subject of the finite element study disclosed in this application; and, FIG. 15 is a graph showing the self-aligning torque generated by vertical force applied to a tread element, and comparing a "real world" Goodyear Invicta GA(L) tread element with a 15 degree twist, a "real world" Goodyear Invicta GA(L) tread element with a 5 degree twist, and a 1 inch×1 inch square tread block with a 15 degree twist, that has the same nonskid depth (0.277 inches) as the Invicta GA(L) lugs.

With reference to FIG. 14, a more elaborate finite element model of a real-life tire tread element 48 was constructed. The tread element 48 illustrated in FIG. 14 is a tread element from a tire tread manufactured and sold by The Goodyear Tire & Rubber Company under the trade name Invicta GA(L).

Figure 15:
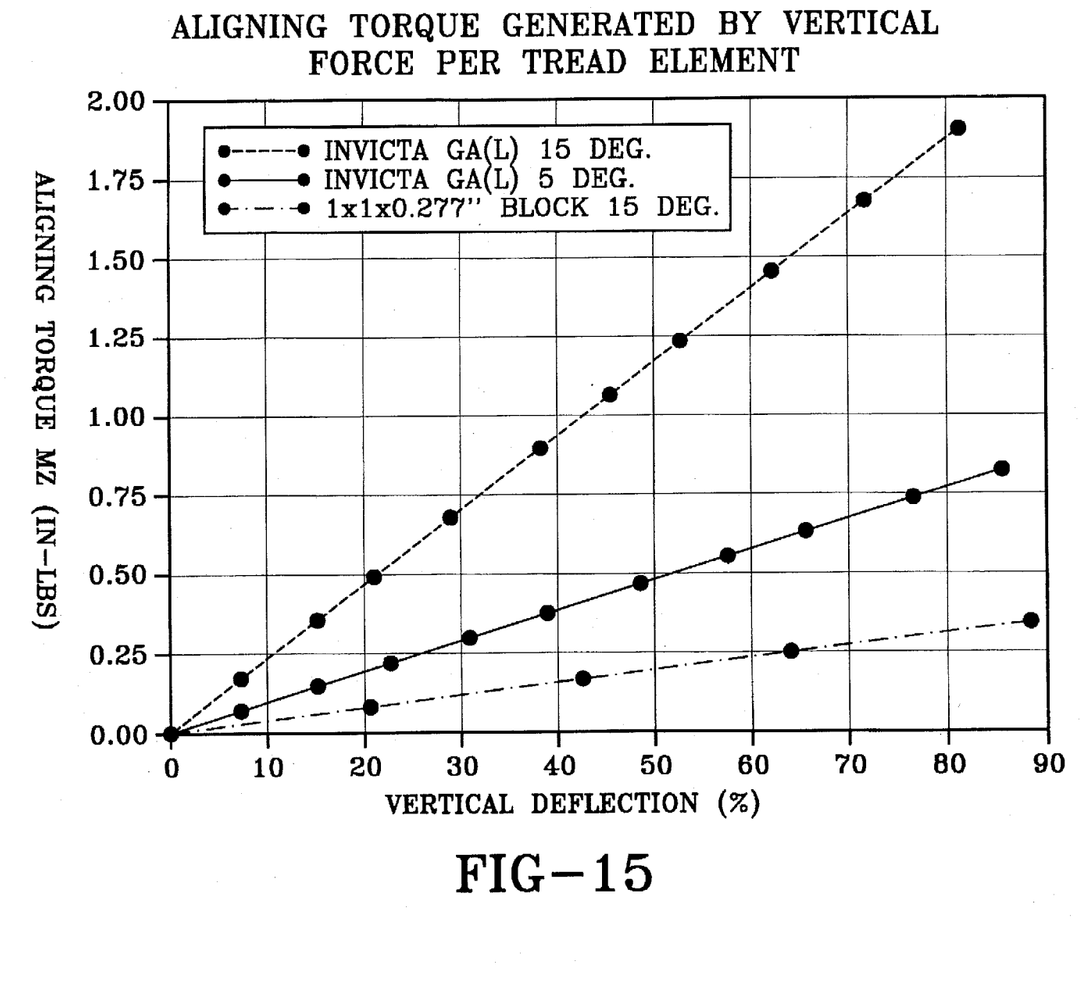

The tread element shown in FIG. 14 was subjected to various analyses through finite element modeling and the results were analyzed and are presented in a graph at FIG. 15. As is evident, a higher degree of angle twist increased the self-aligning torque generated by the tread element. For example, line 56 represents the self-aligning torque generated by an tread element as illustrated in FIG. 14 with a 15 degree twist. Line 58 illustrates the amount of torque generated by an identical tread element with a 5 degree twist. Line 60 illustrates the amount of twist generated by a one inch by one inch by 0.277 inch (0.704 cm) solid block with a 15 degree twist.

The invention has been described with reference to a preferred embodiment. Obviously, modifications and alterations will occur to others upon a reading and understanding of this specification. It is intended to include all such modifications and alterations insofar as they come within the scope of the appended claims or the equivalents thereof.

What is claimed is:

1. A tire comprising a tread wherein the tread includes a tread element, the tread element having a centroid, a top surface, a base surface displaced radially inwardly from the top surface, and side surfaces extending radially between the top surface and the base surface, the tread element being twisted so that the side surfaces are twisted and so that the top surface is rotated relative to the bottom surface by a predetermined angle of rotation about a radial line through the centroid and wherein a net torque is generated about the radial line passing through the centroid when the tread element is compressed.

2. The tire of claim 1 wherein the predetermined angle of rotation is between 5 degrees and 15 degrees.

3. The tire of claim 1 wherein the net torque counters a residual self aligning torque of the tire.

\* \* \* \* \*